(12) United States Patent
Li

(10) Patent No.: US 6,762,879 B1
(45) Date of Patent: Jul. 13, 2004

(54) METHOD AND SYSTEM FOR PROVIDING AN OPTICAL CIRCULATOR

(75) Inventor: Wei-Zhong Li, San Jose, CA (US)

(73) Assignee: Oplink Communications, Inc., San Jose, CA (US)

(*) Notice: Subject to any disclaimer, the term of this patent is extended or adjusted under 35 U.S.C. 154(b) by 131 days.

(21) Appl. No.: 09/967,864

(22) Filed: Sep. 28, 2001

(51) Int. Cl.⁷ .............................................. G02B 27/28
(52) U.S. Cl. .................. 359/484; 359/282; 359/495; 359/497; 359/900; 372/703; 385/11; 385/27; 385/33; 385/36; 385/39
(58) Field of Search ................................ 359/282, 495, 359/497, 900, 484, 494, 281; 372/703; 385/11, 27, 33, 36, 39

(56) References Cited

U.S. PATENT DOCUMENTS 5,499,132 A * 3/1996 Tojo et al. ................... 359/281
6,178,044 B1 * 1/2001 Li et al. ...................... 359/484

* cited by examiner

Primary Examiner—Audrey Chang
Assistant Examiner—Craig Curtis
(74) Attorney, Agent, or Firm—Fish & Richardson P.C.

(57) ABSTRACT

In another aspect, the invention provides a closed loop optical circulator including a first crystal for splitting an input light signal into two components, a second crystal for deflecting the two components received from the first crystal in a direction if the two components have a first polarization, a third crystal for deflecting the two components received from the second crystal in an opposite direction if the two components have the first polarization, and a fourth crystal for joining the two components received from the third crystal.

19 Claims, 4 Drawing Sheets

METHOD AND SYSTEM FOR PROVIDING AN OPTICAL CIRCULATOR

BACKGROUND OF THE INVENTION

An optical circulator is a multi-ported passive device designed to receive as an input an optical signal on one port and transmit the optical signal to another port. Conventional optical circulators are employed in systems that require the transmission of an optical signal in a particular direction. For example, U.S. Pat. No. 4,650,289 by Kuwahara describes a conventional optical circulator. FIG. 1 is a diagram of one such conventional optical circulator 10. The conventional optical circulator 10 includes four ports, port A 12, port B 24, port C 32, and port D 34. The conventional optical circulator 10 also includes polarizer prisms 14 and 22, mirrors 16 and 26, Faraday rotators 18 and 28, and optically active elements (e.g., half wave plates) 20 and 30. Polarizer prisms 14 and 22 transmit light in different directions depending on the polarization of the light. Light polarized in a first direction is transmitted undeflected by the or polarizer prisms 14 and 22. Light polarized in a second direction is transmitted at an angle of ninety degrees from the first direction. The mirrors 16 and 26 merely reflect light without a change in polarization. The Faraday rotators 18 and 28 rotate the direction of polarization of incident light by forty-five degrees in a particular direction regardless of the direction in which light traverses the Faraday rotators 18 and 28. For example, the Faraday rotator 18 rotates the polarization of light from the mirror 16 in the same direction as light from the optically active element 20. Optically active elements 20 and 30 rotate the polarization of incident light by forty-five degrees. However, the direction that the polarization is rotated depends upon the direction in which the light traverses the optically active elements 20 and 30 (i.e., optically active elements 20 and 30 are reciprocal devices). For example, optically active element 20 will rotate light from the Faraday rotator 18 by forty-five degrees in a particular direction. The optically active element 20 will rotate light from the polarizer prism 22 having the same polarization by forty-five degrees in the opposite direction. The Faraday rotator is an optically irreversible (i.e., non-reciprocal) element, that is, the rotation angle will double for light after a round trip through the Faraday rotator. Optically active elements 20 and 30 are reciprocal, that is, light after a round trip through these devices will not be rotated.

In operation, the Faraday rotator of 18 and optically active element 20 act as a function group that rotates polarization 90 degrees for light traveling from left to right (from 16 to 22) but doesn't rotate polarization for the light passing through from right to left (from 22 to 16). Similarly, optically active element 30 and faraday rotator 28 act as another function group with similar functionality. Input light has random polarization and includes two components. Polarizer prisms 14 or 22 reflect one component of the input light while another component passes through undeflected. For the purposes of this example, the first polarization P can be characterized as having a polarization that is in the incident plane (paper surface) and the second polarization S which polarization is perpendicular to the incident plane. The P components pass through polarizer prism 14 or 22, but S components reflect 90 degrees at an intersection to the surface. More specifically, a light with random SOP (State of Polarization) input to port 1 and transmitted to prism 14, divides into S and P components. The P components pass through to a second path (including components 12, 30, 28, 26 and 22), while the S components reflect to a first path (including components 14, 16, 18, 20 and 22).

For signal from port A to port B, the S components pass along the first path through the functional group of 18 and 20, change polarization to be P, passes through polarizer prism 22 to port B. The P component from port A, passes through polarizer prism 14, changes to be S polarization by functional group 30 and 28, and then reflects at polarizer prism 22 to port B also. Accordingly, polarizer prism 14 acts as a splitter while polarizer prism 22 acts as a combiner, producing the full signal from port A to port B.

For signal from port B to port C, the S components arriving at port B are reflected to the second path, pass through functional group of 28 and 30, maintain their S polarization, and are reflected at polarizer prism 14 to port C. The P component of the input light introduced at port B passes through polarizer prism 22 to the first path, passes through functional group of 18 and 20, maintains the P polarization, and then passes through polarizer prism 14 to port C also. In this case, polarizer prism 22 is a splitter and polarizer prism 14 is a combiner. Thus the full signal from port B is received by port C. Similarly, the full signal from port C is delivered to port D and the full signal from port D to port A.

Optical circulators of this type are very difficult to manufacture. The difficulty arises in the perfectly parallel optical paths that must be maintained in the device (i.e., paths between polarizer prisms 14 and 22). At the present time, no such devices are commercially offered.

SUMMARY OF THE INVENTION

In one aspect the invention provides a closed loop optical circulator including a first port, a last port and means for establishing a last optical path where the last optical path provides a path from the last port to the first port The means for establishing includes two pairs of complementary crystals. Each crystal of a respective pair transmits an optical signal of one polarization without deflection and deflects an optical signal of another polarization. The first pair of complementary crystals deflects optical signals of a second polarization in a direction perpendicular to a plane of a page and receives an optical signal from the last port and transmits the optical signal to the first port. The second pair of complementary crystals operable deflects optical signals of a first polarization in a direction along the plane of the page and is disposed between the first pair of complementary crystals. The optical circulator includes two pairs of complementary half wave plate rotators. Each pair of complementary half wave plate rotators is disposed between a crystal of the first pair and a crystal of the second pair of complementary crystals. Each half wave plate rotator includes a pair of half wave plate rotator groups where it each group includes a half wave plate and a glass portion. The optical circulator includes a half wave plate and a Faraday rotator disposed between crystals of the second pair of complementary crystals.

In another aspect, the invention provides a closed loop optical circulator including a first port, a last port and a path between the two including two pairs of complementary crystals. Each crystal of a respective pair transmits an optical signal of one polarization without deflection and deflects an optical signal of another polarization. The first pair of complementary crystals deflects optical signals of a second polarization in a direction perpendicular to a plane of a page and receives an optical signal from the last port and transmits the optical signal to the first port. The second pair of complementary crystals deflects optical signals of a first polarization in a direction along the plane of the page and disposed between the first pair of complementary crystals. The optical circulator includes two pairs of complementary half wave plate rotators. Each pair of complementary half wave plate rotators is disposed between a crystal of the first pair and a crystal of the second pair of complementary crystals. Each half wave plate rotator includes a pair of half wave plate rotator groups where each group includes a half wave plate and a glass portion. The optical circulator includes a half wave plate and a Faraday rotator disposed between crystals of the second pair of complementary crystals.

In another aspect, the invention provides a closed loop optical circulator including a plurality of ports and a like plurality of paths. Each path couples a pair of ports, where light incident at a port is transmitted along a path to a next port in the closed loop circulator. The paths include a first crystal for splitting an input light signal into two components, a second crystal for deflecting the two components received from the first crystal in a direction if the two components have a first polarization, a third crystal for deflecting the two components received from the second crystal in an opposite direction if the two components have the first polarization, and a fourth crystal for joining the two components received from the third crystal.

Aspects of the invention can include one or more of the following features. The crystals can be constructed from birefringent material. The second and third crystals can be Yvo4 crystals. The first pair of complementary half wave plate rotators can include a first half wave rotator group having a half wave plate covering a second and third quadrants and a glass plate covering a first and fourth quadrants and a second half wave rotator group having a half wave plate covering a third and fourth quadrants and a glass plate covering a first and second quadrants. The second pair of complementary half wave plate rotators can include a first half wave rotator group having a half wave plate covering a third and fourth quadrants and a glass plate covering a first and second quadrants and a second half wave rotator group having a half wave plate covering a first and fourth quadrants and a glass plate covering a second and third quadrants.

In another aspect, the invention provides a closed loop optical circulator including a first crystal for splitting an input light signal into two components, a second crystal for deflecting the two components received from the first crystal in a direction if the two components have a first polarization, a third crystal for deflecting the two components received from the second crystal in an opposite direction if the two components have the first polarization, and a fourth crystal for joining the two components received from the third crystal.

In another aspect, the invention provides a closed loop optical circulator including first, second, third and fourth ports. The optical circulator includes a first crystal splitting an input light signal received at the first and third ports into two components respectively, and joining input light components received from each of the second and fourth ports respectively into output light signals. The optical circulator includes a second crystal deflecting the two components received from the first crystal in a direction for signals from the first port, while not reflecting signals from the third port, and deflecting the two components received from a third crystal in an opposite direction for signals from the fourth port, while not reflecting signals from the second port. The third crystal deflects the two components received from the second crystal in an opposite direction for signals from the first port while not reflecting signals from the third port, and deflects the two components received from a fourth crystal in an opposite direction for signals from the second port, while not reflecting signals from the fourth port. The fourth crystal splits an input light signal received at the second and fourth ports into two components respectively, and joins input light components received from each of the first and second ports respectively into output light signals.

Aspects of the invention can include one or more of the following advantages. The present invention provides an easily manufacturable optical circulator with a loop function such that an optical signal input at a last port is returned to a first port in the device. Other advantages will be readily apparent from the attached figures and the description below.

DETAILED DESCRIPTION OF THE INVENTION

The present invention relates to an improvement in optical technology. The following description is presented to enable one of ordinary skill in the art to make and use the invention and is provided in the context of a patent application and its requirements. Various modifications to the invention will be readily apparent to those skilled in the art and the generic principles herein may be applied to other embodiments. Thus, the present invention is not intended to be limited to the embodiments shown, but is to be accorded the widest scope consistent with the principles and features described herein.

The present invention will be described in terms of an optical circulator having specific components having a specific configuration. Similarly, the present invention will be described in terms of optical circulator components having specific relationships, such as distances or angles between components. However, one of ordinary skill in the art will readily recognize that this method and system will operate effectively for other components having similar properties, other configurations, and other relationships between components.

Figure 1:
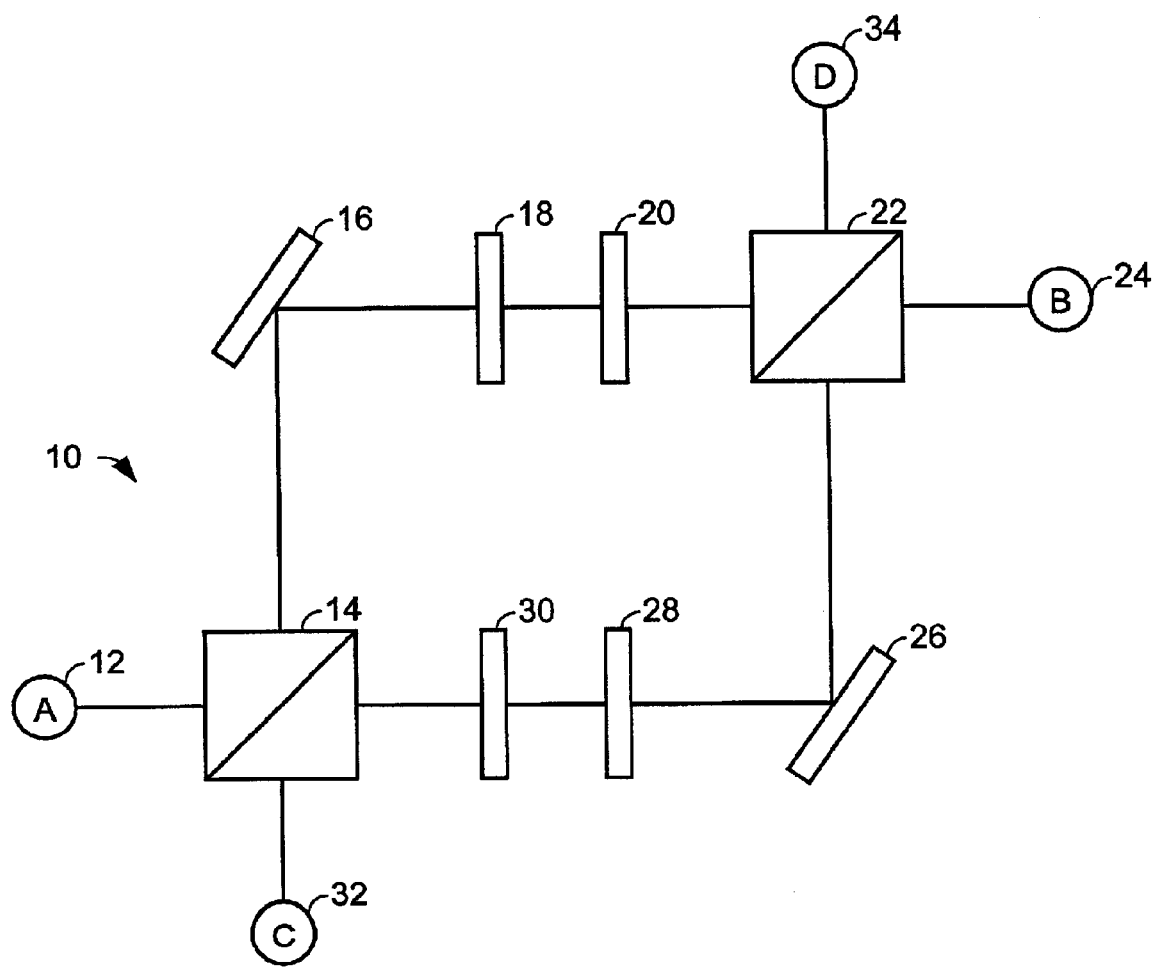
FIG. 1 is a diagram of a conventional optical circulator.
Figure 2:
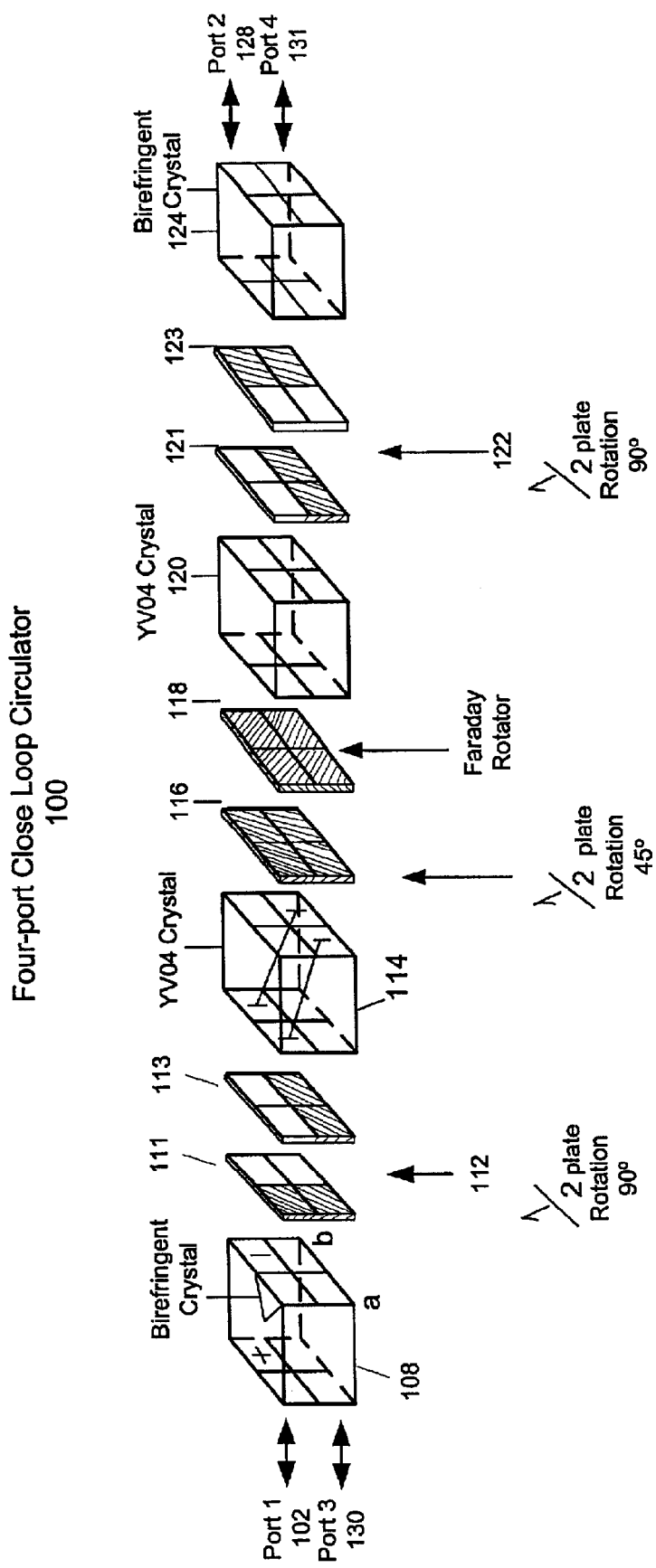
FIG. 2 depicts a perspective view of an optical circulator in accordance with the present invention.

Referring now to FIG. 2, depicting one implementation of an optical circulator 100 in accordance with the present invention. FIG. 2 shows a perspective view of the optical circulator 100. The optical circulator 100 includes four ports, a first port 102, a second port 128, a third port 130 and fourth port 131. The first port 102 is coupled to a first fiber (not shown) and is operable to receive and transmit optical signals. The second, third and fourth ports 128, 130 and 131 are coupled to second, third and fourth fibers (not shown), respectively, each of which are also operable to receive and transmit optical signals. The optical circulator 100 is configured such that an optical signal input to one port (e.g., first port 102) will be provided to a next port (e.g., second port 128) along an optical path (e.g., the first optical path). Accordingly, in the four-port design shown, four optical paths are provided. Optical circulator 100 is configured in a closed loop configuration such that optical signals from a last port (e.g., the fourth port 131) are transmitted to a first port (e.g., the first port 102). Optical circulator 100 is configured such that an optical signal input to the first port 102 will not be transmitted to the third port 130. Similarly, an optical signal input to the second port 128 will not be provided to the first port 102 and optical signal inputted on the fourth port 131 will not be provided to the third port 130.

In order to establish the four optical paths, the optical circulator 100 includes a first birefringent material (crystal) 108, a first pair of half wave plate (HWP) rotators 112, a first crystal 114, a half wave plate 116, a Faraday rotator 118, a second crystal 120, a second pair of HWP rotators 122, and a second birefringent material 124.

An optical signal input to a port is typically randomly polarized. The optical signal can be decomposed into two components with the state of polarization (SOP) of each orthogonal to each other and to the propagation direction. The two components are referred to as "o" and "e" rays. Thus, an input optical signal can be decomposed into a first portion having a first polarization and a second portion having a second polarization. Optical circulator 100 separates random SOP light into two components. The SOP of one of the components is rotated by 90 degrees, such that the two components have the same SOP. Accordingly, each component behaves the same along the path to the second optical port since each component along the path is polarization dependent. Just before traveling to the second port, the SOP of one component win be rotated 90 degrees back. Thereafter, a displacement element is used to combine the two components together into the second port.

Figure 3A:
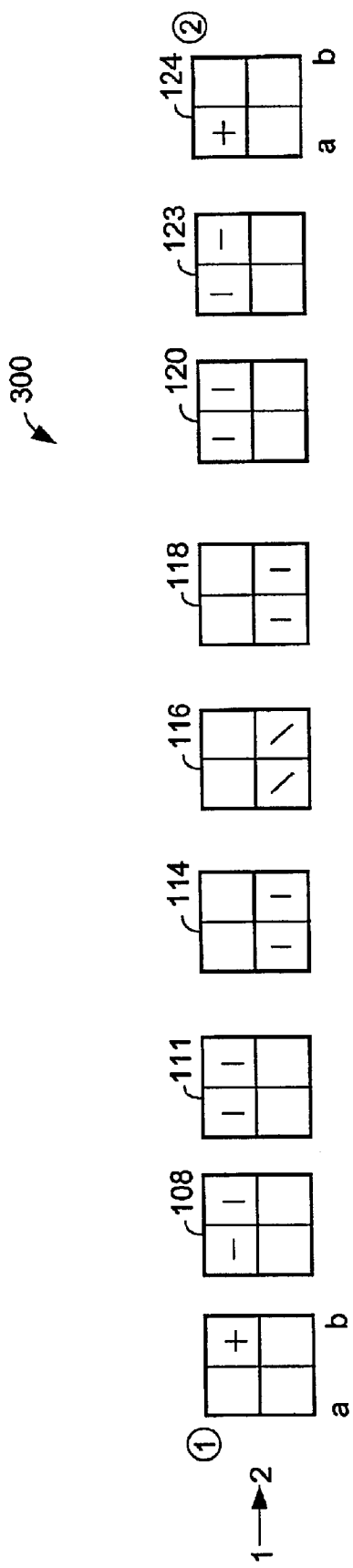
FIG. 3a depicts the polarization of an optical signal traveling along a first optical path (from a first port to a second port) after passing through particular components.

First and second birefringent materials 108 and 124 are displacement elements. The birefringent materials treat components having a first polarization state differently from components having a second polarization state. First birefringent material 108 decomposes light received on a first port into two components (o and e rays) whose SOP are perpendicular to each other and perpendicular to propagation direction. The first birefringent material 108 transmits a first component having a first polarization state undeflected (i.e., o rays having a vertical SOP are un-deflected). The first birefringent material 108 transmits a second component having a second polarization state with a deflection, shown in FIG. 3a (i.e., e rays having a horizontal SOP are deflected). The deflection is shown as being horizontal and substantially perpendicular to the direction of propagation. Two components of a received optical signal are separated a predefined distance due to the deflection. For example, FIG. 3a shows optical circulator 100 and includes four quadrants (Q1–Q4). First port 102 is coupled to a first quadrant. At the first birefringent material 108, o rays associated with optical signals received on the first port 102 pass through the first birefringent material 108 and remain in the first quadrant Q1. E rays are deflected to the second quadrant Q2.

The second birefringent material 124 is complementary, providing a deflection that is a same predefined distance. For example, at the second birefringent material 124, o rays associated with optical signals received on the first port 102 pass through the second birefringent material 108 and remain in the second quadrant Q1. E rays are deflected from the first quadrant to the second quadrant Q2, thereby combining the components in the second quadrant that in turn is coupled to the second port 128.

The first pair of HWP rotators 112 includes HWP rotator group 111 and HWP rotator group 113. HWP rotator group 111 includes a half wave plate and a bare glass plate where the half wave plate only covers quadrants Q2 and Q3 while the bare glass plate covers quadrants Q1 and Q4. The half wave plate rotates the SOP of a component to a mirror position against its optical axis. The orientation of the optical axis for the half wave plate is 45 degrees against the crystal edge. HWP rotator group 113 includes a half wave plate covering quadrants Q3 and Q4, and bare glass plate covering quadrant Q1 and Q2.

The second pair of HWP rotators 122 includes HWP rotator group 121 and HWP rotator group 123. HWP rotator group 121 includes a half wave plate and a bare glass plate where the half wave plate only covers quadrants Q3 and Q4 while the bare glass plate covers quadrants Q1 and Q2. The orientation of the optical axis for the half wave plate is 45 degrees against the crystal edge. HWP rotator group 124 includes a half wave plate covering quadrants Q1 and Q4, and bare glass plate covering quadrant Q2 and Q3.

First and second crystals 114 and 120 are similar to first and second birefringent crystals 108 and 124 in that they both deflect light of one polarization while transmitting light undeflected of another polarization. First and second crystals 114 and 120 operate to deflect light of the first polarization (having a vertical SOP) and transmit light of the second polarization (having a horizontal SOP). In addition, first and second crystals 114 and 120 operate to deflect light of the first polarization in a direction that is along the plane of the page. First and second crystals 114 and 120 each include an axis that is substantially parallel to the axis of the Faraday rotator. For example, light of a first polarization state and traveling towards the second port 128 is deflected approximately along the plane of the page (in the −y direction) by the first crystal 114. Similarly, the second crystal 120 deflects light of the first polarization state and traveling to the second port 128 along the plane of the page (in the +y direction). In one implementation, each of first and second crystals 114 and 120 are YVo4 crystals.

Half wave plate 116 covers all four quadrants. The optical axis of half wave plate 116 is at 22.5 degrees to the vertical edge, pointing to Q2. For example, the half wave plate 116 rotates the SOP of the two components received from crystal 114 in quadrants Q3 and Q4 to a mirror position against its optical axis, so the SOP of the two components becomes 45 degrees (10:30 O'clock).

Faraday rotator 118 rotates the SOP components 45 degrees clockwise. For example, the SOP of the two components received from half wave plate 116 in quadrants Q3 and Q4 transitions to vertical again after passing through the faraday rotator 118.

Figure 3B:
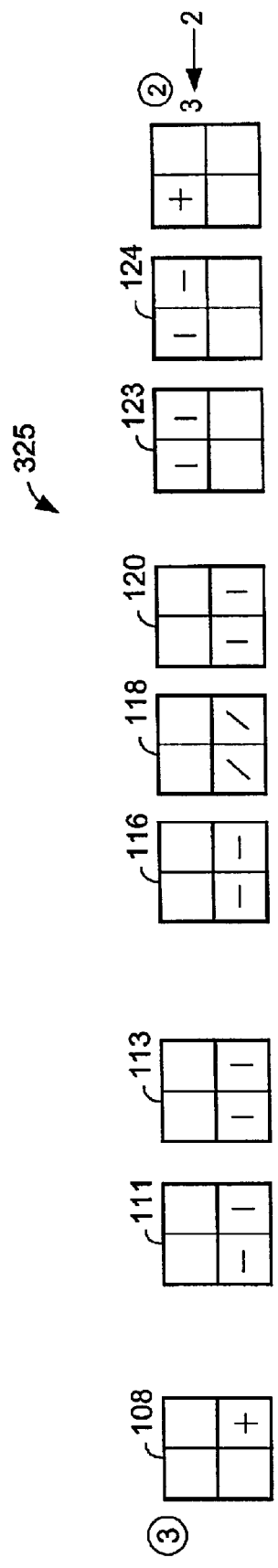
FIG. 3b depicts the polarization after particular components when the optical signal travels along a second optical path (from the second port to a third port).

Referring to FIGS. 3a and 3b, to further illustrate the optical circulator 100 in accordance with the present invention, an optical signal traversing the first optical path 300 (from the first port 102 to the second port 128) and an optical signal traversing the second optical path 325 (from the second port 128 to the third port 130) is shown. For clarity, specific rotations of light. polarized in the first and second states will be discussed. However, as discussed above, different polarization rotations can be used.

First, an optical signal traveling along the first optical path 300 is discussed. As discussed above, the optical signal input to the first port 102 can be considered to have a random polarization.

FIG. 3a depicts the polarizations after passing through particular elements as the optical. signal travels along a first optical path 300, from the first port 102 to the second port 128. The first polarization state is depicted as vertical in FIG. 3a, while the second polarization state is horizontal. The polarizations are labeled consistently with their respective elements. For example, the polarizations of the first and second portions of the optical signal after transmission by the first birefringent material 108 (FIG. 2) are labeled 108 in FIG. 3a. In the first optical path 300, the components are not affected by transmission through HWP rotator group 113 (FIG. 2) and HWP rotator group 121 (FIG. 2), and as such, have not been shown.

Referring now to FIGS. 2 and 3a, the optical signal is provided from a fiber collimator for the first port 102 to the first birefringent material 108 in quadrant Q1. The first birefringent material 108 transmits a first component having a first polarization state undeflected in quadrant Q1 (i.e., o rays having a vertical SOP are un-deflected). The first birefringent material 108 transmits a second component having a second polarization state with a deflection from quadrant Q1 to Q2, shown in FIG. 3a (i.e., e rays having a horizontal SOP are deflected). The first and second components of the optical signal are then provided in quadrants Q1 and Q2 to the first HWP rotators 112.

The half wave plate in HWP rotator group 111 rotates the horizontal SOP of an e ray received from the first birefringent material 108 (covered by the HWP) to mirror the position of its optical axis (i.e., the SOP of the e ray becomes vertical). The SOP of the o ray received from the first birefringent material 108 remains unchanged (i.e., vertical) because it just passes through the bare glass plate. After traversing HWP rotator group 111, the SOP of the two components in quadrants Q1 and Q2 (e and o rays) are the same.

The components received from the HWP rotator group 113 in quadrants Q1 and Q2 are moved to quadrants Q3 and Q4 as they pass through crystal 114. Half wave plate 116 rotates the SOP of the two components received from crystal 114 to a mirror position against its optical axis, so the SOP of the two components becomes 45 degrees (10:30 O'clock). Faraday rotator 118 rotates the SOP of the two components 45 degrees clockwise. More specifically, the SOP of the two components received from half wave plate 116 in quadrants Q3 and Q4 transitions to vertical again after passing through the faraday rotator 118.

The second pair of HWP rotators 122 includes HWP rotator group 121 and HWP rotator group 123. HWP rotator group 123 maintains the component received in quadrant Q2 from HWP rotator group 121 (i.e., maintains its vertical SOP as it passes through the bare glass plate), and the rotates to horizontal the component in quadrant Q1 received from HWP rotator group 121 that is covered by a half wave plate. The SOP of two components becomes orthogonal again and is ready to be recombined by second birefringent material 124. At the input to the second birefringent material 124, the first portion of the optical signal has the second polarization state, while the second portion of the optical signal has the first polarization state. When the first and second portions of the optical signal are transmitted through the second birefringent material 124, the first portion of the optical signal is deflected in the −x direction from quadrant Q1 to Q2, while the second portion of the optical signal is transmitted undeflected in quadrant Q2. Consequently, the first and second portions of the optical signal are recombined in quadrant Q2. The optical signal can then be output by the second port 128.

The optical circulator 100 functions similarly when an optical signal is input to the second port 128. The second optical path 325, traversed when the optical signal is input to the second port 128, is discussed with reference to FIG. 3b. Again, for clarity, specific rotations of light polarized in the first and second states will be discussed. However, as discussed above, different polarization rotations can be used.

As discussed above, the optical signal input to the second port 128 can be considered to have a random polarization. FIG. 3b depicts the polarizations after passing through particular elements as the optical signal travels along a second optical path 325, from the second port 128 to the third port 130. The polarizations are labeled consistently with their respective elements. The components are not affected by transmission through the HWP rotator group 121 (FIG. 2) and the first crystal 114 (FIG. 2) in the second optical path 325, and as such, have not been shown.

Referring now to FIGS. 2 and 3b, the optical signal is provided from a fiber collimator for the second port 128 to the second birefringent material 124. The second birefringent material 124 splits the optical signal into a first component and a second component. The first component has the first polarization state, while the second component has the second polarization state. As discussed above, the first component traverses the second birefringent material 124 undeflected in the quadrant Q2. However, the second component, having the second polarization state, is deflected in a horizontal, (+x) direction to quadrant Q1. The first and second components of the optical signal are then provided in quadrants Q1 and Q2 respectively, to the second HWP rotators 122.

HWP rotator group 123 rotates the polarization of the second component of the optical signal received in quadrant Q1 such that both components have the same polarization (vertical) when they pass from the second HWP rotators 122 to crystal 120. Both components are deflected in a vertical direction (−y direction) in the second crystal 120 from quadrants Q1 and Q2 to Q3 and Q4, respectively. The polarization of the first and second components of the optical signal are then rotated by each of Faraday rotator 118 and half wave plate 116 and then are provided (including passing through the first crystal 114 since both have a second polarization state) to the first HWP rotators 112. HWP rotator group 113 rotates the polarizations of both the first and second components in quadrants Q3 and Q4, while the HWP group rotator 111 rotates the polarization of the first component of the optical signal in quadrant Q3. When the first and second components of the optical signal are transmitted through the first birefringent material 108, the first component of the optical signal is deflected in the +x direction from quadrant Q3 to Q4, while the second portion of the optical signal is transmitted undeflected in quadrant Q4. Consequently, the first and second portions of the optical signal are recombined in quadrant Q4. The optical signal can then be output by the third port 130.

The optical circulator 100 functions similarly when an optical signal is input to the third port 130. The third optical path 350, traversed when the optical signal is input to the third port 130, is discussed with reference to FIG. 3c. Again, for clarity, specific rotations of light polarized in the first and second states will be discussed. However, as discussed above, different polarization rotations can be used.

Figure 3C:
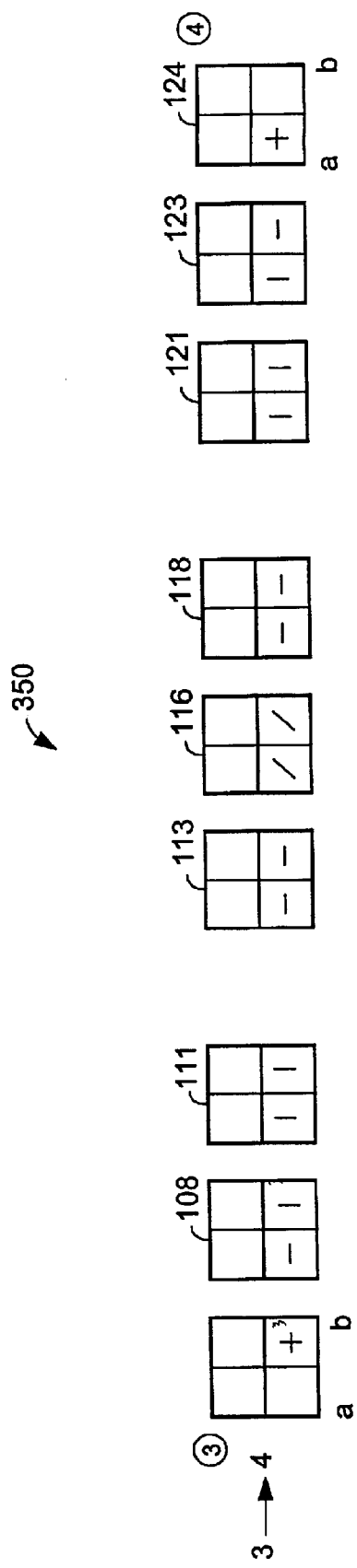
FIG. 3c depicts the polarization after particular components when the optical signal travels along a third optical path (from the third port to a fourth port).

As discussed above, the optical signal input to the third port 130 can be considered to have a random polarization. FIG. 3c depicts the polarizations after passing through particular elements as the optical signal travels along a third optical path 350, from the third port 130 to the fourth port 131. The components are not affected by transmission through the first and second crystals 114 and 120 (FIG. 2) in the third optical path 350, and as such, have not been shown.

Referring now to FIGS. 2 and 3c, the optical signal is provided from a fiber collimator for the third port 130 to the first birefringent material 108. The first birefringent material 108 transmits a first component having a first polarization state undeflected in quadrant Q4 (i.e., o rays having a vertical SOP are un-deflected). The first birefringent material 108 transmits a second component having a second polarization state with a deflection from quadrant Q4 to Q3, shown in FIG. 3c (i.e., e rays having a horizontal SOP are deflected). The first and second components of the optical signal are then provided in quadrants Q3 and Q4 to the first HWP rotators 112.

The half wave plate in HWP rotator group 111 rotates the horizontal SOP of an e ray received from the first birefringent material 108 (covered by the HWP) to mirror the position of its optical axis (i.e., the SOP of the e ray becomes vertical). The SOP of the o ray received from the first birefringent material 108 remains unchanged (i.e., vertical) because it just passes through the bare glass plate. After traversing HWP rotator group 111, the SOP of the two components in quadrants Q3 and Q4 (e and o rays) are the same.

The half wave plate in HWP rotator group 113 rotates the SOP of both components in quadrants Q3 and Q4 to horizontal. The components are passed (undeflected through crystal 114) to half wave plate 116. Half wave plate 116 and Faraday rotator 118 each rotate the components in quadrants Q3 and Q4. More specifically, the SOP of the two components received from half wave plate 116 in quadrants Q3 and Q4 transitions to horizontal again after passing through the faraday rotator 118.

HWP rotator group 123 maintains the component received in quadrant Q3 from HWP rotator group 121 (i.e., maintains its vertical SOP as it passes through the bare glass plate), and then rotates to horizontal the component in quadrant Q4 that is covered by a half wave plate. The SOP of two components becomes orthogonal again and is ready to be recombined by second birefringent material 124. When the first and second components of the optical signal are transmitted through the second birefringent material 124, the first component of the optical signal received in quadrant Q4 is deflected in the −x direction from quadrant Q4 to Q3, while the second portion of the optical signal is transmitted undeflected in quadrant Q3. Consequently, the first and second portions of the optical signal are recombined in quadrant Q3. The optical signal can then be output by the fourth port 131.

The optical circulator 100 functions similarly when an optical signal is input to the fourth port 131. The fourth optical path 375, traversed when the optical signal is input to the fourth port 131, is discussed with reference to FIG. 3d. Again, for clarity, specific rotations of light polarized in the first and second states will be discussed. However, as discussed above, different polarization rotations can be used.

Figure 3D:
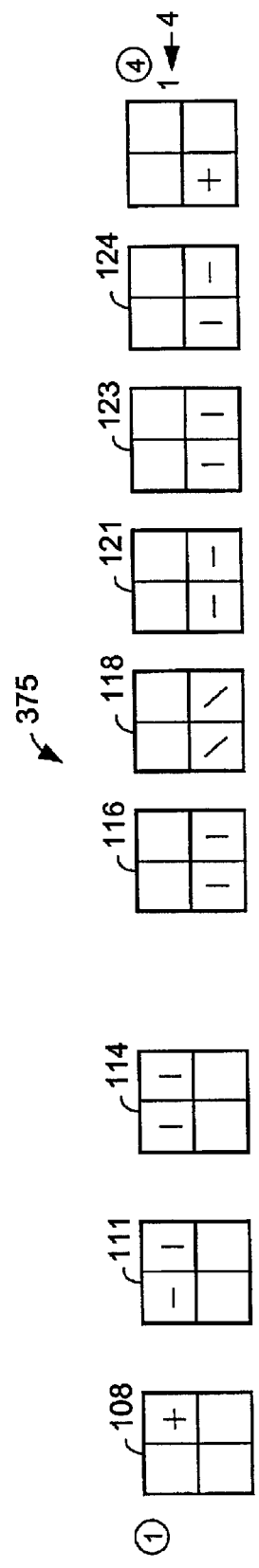
FIG. 3d depicts the polarization after particular components when the optical signal travels along a fourth optical path (from the fourth port to the first port).

FIG. 3d depicts the polarizations after passing through particular elements as the optical signal travels along a fourth optical path 375, from the fourth port 131 to the first port 102. The first polarization state is depicted as vertical in FIG. 3d, while the second polarization state is horizontal. The polarizations are labeled consistently with their respective elements. For example, the polarizations of the first and second portions of the optical signal after transmission by the second birefringent material 124 (FIG. 2) are labeled 124 in FIG. 3d. The components are not affected by transmission through HWP rotator group 113 (FIG. 2) and the second crystal 120 (FIG. 2) in the fourth optical path 375, and as such, have not been shown.

Referring now to FIGS. 2 and 3d, the optical signal is provided from a fiber collimator for the fourth port 131 to the second birefringent material 124. The second birefringent material 124 splits the optical signal into a first component and a second component. The first component has the first polarization state, while the second component has the second polarization state. As discussed above, the first component traverses the second birefringent material 124 undeflected in the quadrant Q3. However, the second component, having the second polarization state, is deflected in a horizontal, (+x) direction to quadrant Q4. The first and second components of the optical signal are then provided in quadrants Q3 and Q4 respectively, to the second HWP rotators 122.

HWP rotator group 123 rotates the polarization of the second component of the optical signal received in quadrant Q4 such that both components have the same polarization (vertical) when they pass from the second HWP rotators 122 to HWP rotator group 121. HWP rotator group 121 rotates the polarization of both components of the optical signal received in quadrants Q3 and Q4 such that both components have a horizontal polarization (and as such pass through crystal 120 (FIG. 2)). The polarization of the first and second components of the optical signal are then rotated by each of Faraday rotator 118 and half wave plate 116 and then are provided to crystal 114. Crystal 114 deflects the components having a vertical SOP in quadrants Q3 and Q4 in a direction along the plane of the page to quadrants Q1 and Q2, respectively. The signals are then presented to first HWP rotators 112 in quadrants Q1 and Q2. HWP rotator group 111 rotates the polarization of the first component of the optical signal in quadrant Q2. When the first and second components of the optical signal are transmitted through the first birefringent material 108, the first component of the optical signal is deflected in the −x direction from quadrant Q2 to Q1, while the second portion of the optical signal is transmitted undeflected in quadrant Q1. Consequently, the first and second portions of the optical signal are recombined in quadrant Q1. The optical signal can then be output by the first port 102.

A method and system has been disclosed for providing an optical circulator, which may have low losses and be low in cost to manufacture. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A closed loop optical circulator comprising:
   a first port;
   a last port;
   means for establishing a last optical path, the last optical path from the last port to the first port, the means for establishing including
      two pairs of complementary crystals, each crystal of a respective pair operable to transmit an optical signal of one polarization without deflection and deflect an optical signal of another polarization, the first pair of complementary crystals operable to transmit signals of a first polarization in a first direction and deflect optical signals of a second polarization in a second direction, the first pair of crystals operable to receive an optical signal from the last port and transmit the optical signal to the first port, the second pair of complementary crystals operable to transmit signals of a second polarization in a third direction and deflect optical signals of a first polarization in a fourth direction, the second pair of crystals disposed between the first pair of complementary crystals, said first and second directions defining a first plane, said third and fourth directions defining a second plane approximately orthogonal to said first plane;

two pairs of complementary half wave plate rotators, each pair of complementary half wave plate rotators disposed between a crystal of the first pair and a crystal of the second pair of complementary crystals, each half wave plate rotator including a pair of half wave plate rotator groups where each group includes a half wave plate and a glass portion; and a halfwave plate and a Faraday rotator disposed between crystals of the second pair of complementary crystals.

2. A closed loop optical circulator comprising:

a first port;

a last port; and a path between the two including two pairs of complementary crystals, each crystal of a respective pair operable to transmit an optical signal of one polarization without deflection and deflect an optical signal of another polarization, the first pair of complementary crystals operable to transmit signals of a first polarization in a first direction and deflect optical signals of a second polarization in a second direction, the first pair of crystals operable to receive an optical signal from the last port and transmit the optical signal to the first port, the second pair of complementary crystals operable to transmit signals of a second polarization in a third direction and deflect optical signals of a first polarization in a fourth direction, the second pair of crystals disposed between the first pair of complementary crystals, said first and second directions defining a first plane, said third and fourth directions defining a second plane approximately orthogonal to said first plane;

two pairs of complementary half wave plate rotators, each pair of complementary half wave plate rotators disposed between a crystal of the first pair and a crystal of the second pair of complementary crystals, each half wave plate rotator including a pair of half wave plate rotator groups where each group includes a half wave plate and a glass portion; and a half wave plate and a Faraday rotator disposed between crystals of the second pair of complementary crystals.

3. A closed loop optical circulator comprising:

a plurality of ports; and a like plurality of paths, each path coupling a pair of ports, where light incident at a port is transmitted along a path to a next port in the closed loop circulator and where the paths includes a first crystal for splitting an input light signal into two components, a second crystal for deflecting the two components received from the first crystal in a direction if the two components have a first polarization, a third crystal for deflecting the two components received from the second crystal in an opposite direction if the two components have the first polarization, and a fourth crystal for joining the two components received from the third crystal.

4. The optical circulator of claim 3 wherein the first and fourth crystals are constructed from birefringent material.

5. The optical circulator of claim 3 wherein the second and third crystals are constructed from birefringent material.

6. The optical circulator of claim 3 wherein the second and third crystals are Yvo4 crystals.

7. The optical circulator of claim 3 further comprising two pairs of complementary half wave plate rotators, one pair of complementary half wave plate rotators disposed between each of the first and second crystals and the third and fourth crystals, each half wave plate rotator including a pair of half wave plate rotator groups where each group includes a half wave plate and a glass portion.

8. The optical circulator of claim 7 further comprising a half wave plate and a Faraday rotator disposed between the second and third crystals.

9. The optical circulator of claim 7 wherein the first pair of complementary half wave plate rotators includes a first half wave rotator group having a half wave plate covering a second and third quadrants and a glass plate covering a first and fourth quadrants and a second half wave rotator group having a half wave plate covering a third and fourth quadrants and a glass plate covering a first and second quadrants.

10. The optical circulator of claim 7 wherein the second pair of complementary half wave plate rotators includes a first half wave rotator group having a half wave plate covering a third and fourth quadrants and a glass plate covering a first and second quadrants and a second half wave rotator group having a half wave plate covering a first and fourth quadrants and a glass plate covering a second and third quadrants.

11. A closed loop-optical circulator-comprising:

a first crystal for splitting an input light signal into two components, a second crystal for deflecting the two components received from the first crystal in a direction if the two components have a first polarization, a third crystal for deflecting the two components received from the second crystal in an opposite direction if the two components have the first polarization, and a fourth crystal for joining the two components received from the third crystal.

12. The optical circulator of claim 11 wherein the first and fourth crystals are constructed from birefringent material.

13. The optical circulator of claim 11 wherein the second and third crystals are constructed from birefringent material.

14. The optical circulator of claim 11 wherein the second and third crystals are Yvo4 crystals.

15. The optical circulator of claim 11 further comprising two pairs of complementary half wave plate rotators, one pair of complementary half wave plate rotators disposed between each of the first and second crystals and the third and fourth crystals, each half wave plate rotator including a pair of half wave plate rotator groups where each group includes a half wave plate and a glass portion.

16. The optical circulator of claim 15 further comprising a half wave plate and a Faraday rotator disposed between the second and third crystals.

17. The optical circulator of claim 15 wherein the first pair of complementary half wave plate rotators includes a first half wave rotator group having a half wave plate covering a second and third quadrants and a glass plate covering a first and fourth quadrants and a second half wave rotator group having a half wave plate covering a third and fourth quadrants and a glass plate covering a first and second quadrants.

18. The optical circulator of claim 15 wherein the second pair of complementary half wave plate rotators includes a first half wave rotator group having a half wave plate covering a third and fourth quadrants and a glass plate covering a first and second quadrants and a second half wave rotator group having a half wave plate covering a first and fourth quadrants and a glass plate covering a second and third quadrants.

19. A closed loop optical circulator comprising:

first, second, third and fourth ports;

a first crystal splitting an input light signal received at the first and third ports into two components respectively, and joining input light components received from each of the second and fourth ports respectively into output light signals;

a second crystal deflecting the two components received from the first crystal in a direction for signals from the first port, while not reflecting signals from the third port, and deflecting the two components received from a third crystal in an opposite direction for signals from the fourth port, while not reflecting signals from the second port;

the third crystal deflecting the two components received from the second crystal in an opposite direction for signals from the first port, while not reflecting signals from the third port, and deflecting the two components received from a fourth crystal in an opposite direction for signals from the second port, while not reflecting signals from the fourth port; and the fourth crystal for splitting an input light signal received at the second and fourth ports into two components respectively, and joining input light components received from each of the first and second ports respectively into output light signals.

* * * * *

UNITED STATES PATENT AND TRADEMARK OFFICE
CERTIFICATE OF CORRECTION

PATENT NO. : 6,762,879 B1
DATED : July 13, 2004
INVENTOR(S) : Wei-Zhong Li

It is certified that error appears in the above-identified patent and that said Letters Patent is hereby corrected as shown below:

Column 12,
Line 35, replace "A closed loop-optical circulator-comprising" with -- A closed loop optical circulator-comprising --

Signed and Sealed this

First Day of March, 2005

JON W. DUDAS
*Director of the United States Patent and Trademark Office*